(12) United States Patent
Therani et al.

(10) Patent No.: US 11,736,437 B2
(45) Date of Patent: Aug. 22, 2023

(54) METHOD FOR ADAPTIVE LOCATION ASSIGNMENT TO IP-INDEXED DATA STREAMS FROM PARTIALLY OBSERVABLE DATA

(71) Applicant: Near Pte. Ltd., Singapore (SG)

(72) Inventors: Madhusudan Therani, San Jose, CA (US); Anil Mathews, Bangalore (IN)

(73) Assignee: NEAR INTELLIGENCE LLC, Pasadena, CA (US)

( * ) Notice: Subject to any disclaimer, the term of this patent is extended or adjusted under 35 U.S.C. 154(b) by 267 days.

(21) Appl. No.: 17/019,244

(22) Filed: Sep. 12, 2020

(65) Prior Publication Data

US 2022/0086122 A1 Mar. 17, 2022

(51) Int. Cl.
*H04L 61/5014* (2022.01)
*G06N 20/00* (2019.01)
*H04W 8/26* (2009.01)
*H04L 61/103* (2022.01)

(52) U.S. Cl.
CPC ......... *H04L 61/5014* (2022.05); *G06N 20/00* (2019.01); *H04L 61/103* (2013.01); *H04W 8/26* (2013.01)

(58) Field of Classification Search
CPC ...................... H04L 2101/69; H04L 61/5007
See application file for complete search history.

(56) References Cited

U.S. PATENT DOCUMENTS

| | | | | |
|---|---|---|---|---|
| 2015/0327007 A1* | 11/2015 | Li | ............ | H04L 67/52 455/456.1 |
| 2016/0105801 A1* | 4/2016 | Wittenberg | ........... | H04W 4/029 455/411 |
| 2016/0381155 A1* | 12/2016 | Pan | ......................... | H04L 67/52 709/221 |
| 2018/0310274 A1* | 10/2018 | Fan | ..................... | H04L 43/0864 |
| 2019/0050874 A1* | 2/2019 | Matlick | ................. | H04L 67/535 |

* cited by examiner

*Primary Examiner* — William G Trost, IV
*Assistant Examiner* — Christopher P Cadorna

(57) ABSTRACT

Disclosed is a method of adaptive assignment of location to internet protocol (IP) indexed data streams using machine learning from partially observable location data. The method includes (i) generating an IP to location map (NM1) and a location to IP map (NM2) by (i) mapping the IP address from location indexed data streams to corresponding location temporally and vice versa, in a base map, (ii) scoring and ranking each entry in the NM1 and the NM2 based on a frequency of use of the IP address, and a number of unique entity identifiers per IP address or per location, (iii) filtering each entry in the NM1 and the NM2 to generate a dynamic IP to location map, and (iv) estimating, a location for an IP indexed data streams at multiple levels of resolutions based on the dynamic IP to location map and an active ST region of each entity.

18 Claims, 12 Drawing Sheets

| LOCATIONS | IP |
|---|---|
| [1.234,102.22] | 109.93.233,123, 108.94.232.121 |
| [37.12,-85.435] | 77.12.234.122, |
| [47.45,38.23] | 92.212.148.27 |

| UNIQUE ENTITY IDENTIFIER | LAST KNOWN LOCATION AND TIME |
|---|---|
| 34567892 | [37.23,42.67, 18:35:22] |

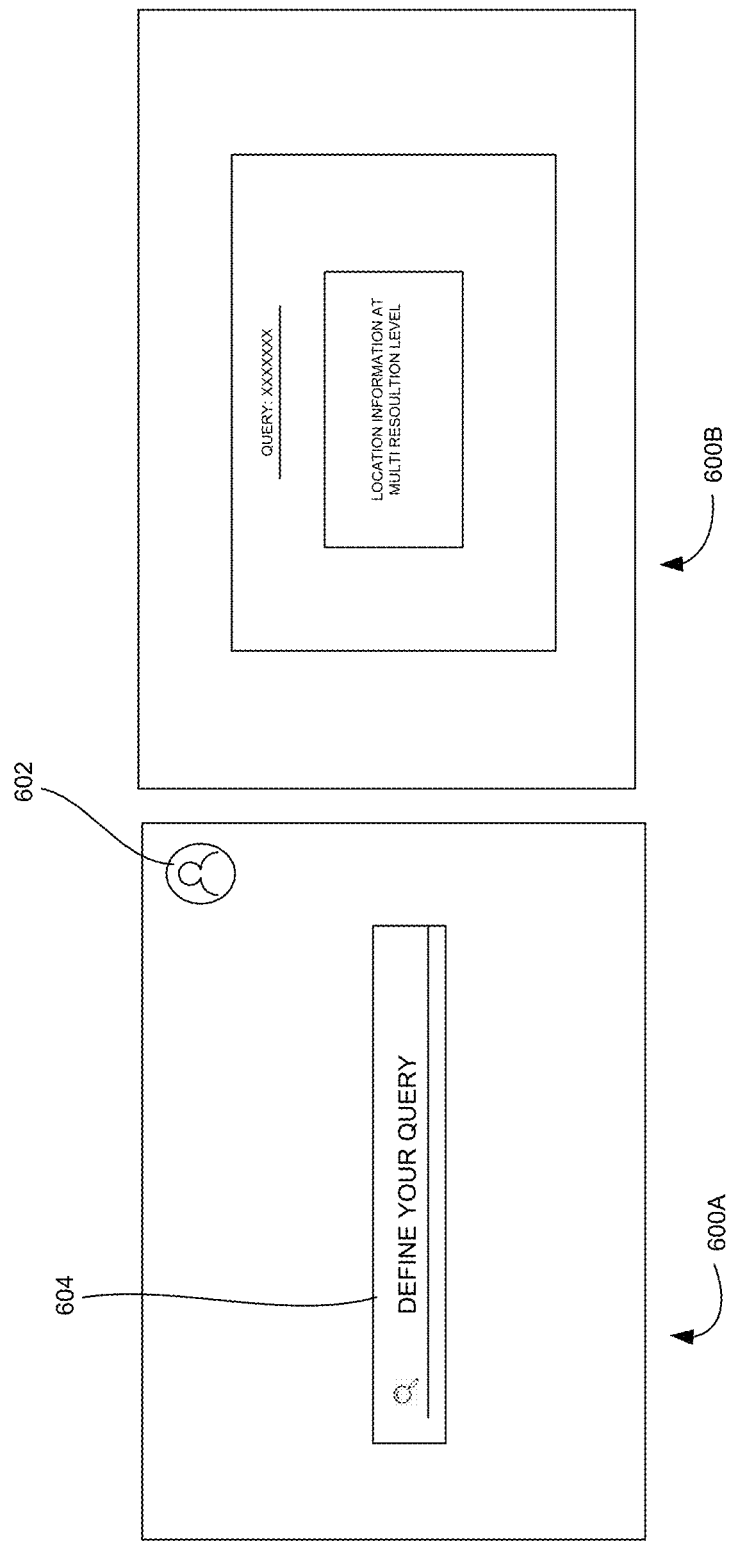

METHOD FOR ADAPTIVE LOCATION ASSIGNMENT TO IP-INDEXED DATA STREAMS FROM PARTIALLY OBSERVABLE DATA

BACKGROUND

Technical Field

The embodiments herein generally relate to location assignment, and more particularly, to an automatic system and method for adaptive location assignment to internet protocol (IP) indexed data streams using machine learning from partially observable data streams that are indexed with both network address and location information.

Description of the Related Art

Many modern data streams of entity activity are generated today such as people on applications, wearable devices, internet of things (IOT), logistic systems, connected cars, and like carry time indicator and public internet protocol (IP) address (to which the devices are connected) along with other payload data. Some data streams may carry explicit geolocation data such as latitude and longitude data if an onboard global positioning system (GPS) is available else no location information is provided. Alternatively, even if location information can be provided, such location information may be removed due to privacy requirements either by an individual or an entity owner. Typically, public IPs which constitute end-points in several exemplary scenarios are associated with a particular geo location (latitude, longitude). As per allocation of IPs on country-basis by internet corporation for assigned names and numbers (ICANN), the public IPs are either static or dynamic (ephemeral) depending on the underlying infrastructure used to implement the network. Real world geolocation of an entity is an essential factor to engage with the entity in terms of services, goods, and media contents and the like. Also, assigning location information to event streams that do not have location information improves the spatio-temporal density of the event streams in the context of a particular point-of-interest, an individual, and the like. Such improvement enables a) better model development to infer properties of the location based on data, b) in context of marketing provides better marketing spend to return on investment (ROI), c) offline attribution measurement in marketing.

Some of the existing approaches employ geolocation estimation techniques to identify entity location based on available location data. Also, several existing approaches train a machine learning model or a regression model with data streams that include network address and a corresponding geolocation to predict geolocation of an entity from the network address. However public IP allocation itself may be dynamic based on the underlying network especially if it is a mobile network. The public IPs for a mobile phone may be highly dynamic depending on the underlying carrier network and may be ephemeral as the public IPs are re-allocated dynamically. Furthermore, the ephemeral IPs could be located geographically anywhere within a network of a service provider and need not be geographically co-located. The above mentioned facts associated with the public IPs add complexity to the process of location estimation. Hence IP to location mapping needs to be constantly updated via incoming data streams and other application-layer approaches for inferring location. Due to partial visibility of incoming data streams from third party sources, constant updating of IP to location mapping is a complex process. Sometimes, the data sources, as observed, switch on and off for several reasons, such as, for example, outages, hardware failure, software failure, network failure, no network access, endpoint failure, intermediaries in the flow, corrupted events, blocked events, dropped events, lost event, user shutdown device and the like. For instance, data flow may be interrupted in airports or during prime hours when a major event is ongoing. Hence, the data may not be received in some regions/areas or time windows. Further, multiple sources of data overlap leading to duplicate event/entity counts—as the same people are recorded as they move around within regions, within countries, across countries. Further, some of the data sources have to be paid for and some of the data sources may not be accessible. In several exemplary scenarios, data may also be protected for maintaining privacy in some countries and consequently, only partial data may be available on a daily basis. Hence based on the partial data, building location context may only be possible up to about 30%.

Moreover, the existing techniques of estimating location for an entity utilize self-disclosed or initially collected IP (that remains static) to location data for estimating geolocation of the network address and are not scalable, are very difficult to bootstrap, and may not be adaptive for dynamic IPs.

Further, the processing of human mobility data points in a real-world environment may have multiple requirements, as for example, scalability, robustness, ability to deal with uncertainty (partial data), and since a single user may use multiple devices such as phone, television, personal computer engaged with a plurality of applications. In several exemplary scenarios, there may be a need to only sample a portion of data to process high throughput data streams under time and resource constraints for scalability. The data may be contextually relevant for a short time period.

Several techniques exist for processing of human mobility data points for multiple data streams that are controlled by a common entity, however, it may be quite a complex process for merging data streams from independently controlled data sources. In this scenario, a single IP may have multiple locations and a single location may have multiple IPs, since different internet service providers use different IPs for the same location. Also, due to large scale of data from multiple sources and partial visibility of data it may be difficult to manually perform the location estimation as a standalone function.

Accordingly, there remains a need for a system and method for mitigating and/or overcoming drawbacks associated with current systems.

SUMMARY

In view of the foregoing, an embodiment herein provides a method for adaptive location assignment to non-location indexed data events based on a partially observable plurality of location indexed data streams. The method includes (i) obtaining, in real time, one or more location indexed data streams that at least partially characterizes an activity of at least one entity, from one or more independently controlled data sources (ii) generating an IP to location map (NM1) and a location to IP map (NM2) by mapping each network address associated with the one or more location indexed data streams to the corresponding locations of the at least one entity temporally and vice-versa, in a base map including a mapping of one or more network addresses to corresponding locations, at multiple levels of resolution based on a historical data stream (iii) scoring and ranking each entry in the NM1 and NM2 based on a frequency of use of the IP address, and a number of unique entity identifiers for each IP address or each location (iv) filtering each entry in the NM1 and the NM2 based on the scoring and the ranking of each entry in the NM1 and the NM2 to generate a dynamic IP to location map and (v) predicting a real-time location for a non-location indexed data event at multiple levels of resolutions using a machine learning model based on the dynamic IP to location map and an active Spatio-Temporal (ST) region for each unique entity identifier associated with the IP address.

In some embodiments, the method includes identifying the active Spatio-Temporal (ST) region for each unique entity identifier associated with the IP address based on the one or more location indexed data streams.

In some embodiments, the method includes extrapolating data points in the one or more location indexed data streams to estimate missed location data on time series and adding an estimated location to the IPs to fill in time-gaps in the one or more location indexed data streams.

In some embodiments, the method includes updating the NM1 and the NM2 based on the one or more location indexed data streams filled with missed location data on time series.

In some embodiments, the method includes classifying each IP addresses in the NM1 and the NM2 as static or dynamic IP address based on the scoring and ranking of each entry.

In some embodiments, the method includes updating the NM1 and the NM2 when a new set of data streams arrives with Bayesian updating technique using Kalman filter.

In some embodiments, the machine learning model is trained with real-time location indexed data streams along with the active ST region of each unique entity identifier to receive an input query includes an IP address and to output real-time location information associated with IP address received.

In some embodiments, one or more location indexed data streams includes latitude data and longitude data.

In some embodiments, one or more location indexed data streams includes an IP address, a spatio-temporal information and at least one entity identifier.

In some embodiments, at least one entity identifier includes at least one of (i) an advertisement identifier (AdID), (ii) a cookie identifier (C) or (iii) a device identifier.

In some embodiments, one or more location indexed data streams of the entity activity includes at least one of (i) location pings from one or more application engaged on the one or more entity devices, (ii) access pings from wireless hot-spots, (iii) active subscriber's data and location in different geo-areas (GSM) from the mobile network, and (iv) local information from traffic sensors or a public CCTV camera for security.

In one aspect, one or more non-transitory computer-readable storage mediums storing the one or more sequences of instructions, which when executed by the one or more processors, causes to perform a method of adaptive location assignment to non-location indexed data events based on a partially observable plurality of location indexed data streams.

In another aspect, a system for adaptive location assignment to non-location indexed data events based on a partially observable plurality of location indexed data streams is provided. The system includes a processor and a memory that stores set of instructions, which when executed by the processor, causes to perform (i) obtaining, in real time, one or more location indexed data streams that at least partially characterizes an activity of at least one entity, from one or more independently controlled data sources (ii) generating an IP to location map (NM1) and a location to IP map (NM2) by mapping each network address associated with the one or more location indexed data streams to the corresponding locations of the at least one entity temporally and vice-versa, in a base map including a mapping of one or more network addresses to corresponding locations, at multiple levels of resolution based on a historical data stream (iii) scoring and ranking each entry in the NM1 and NM2 based on a frequency of use of the IP address, and a number of unique entity identifiers for each IP address or each location (iv) filtering each entry in the NM1 and the NM2 based on the scoring and the ranking of each entry in the NM1 and the NM2 to generate a dynamic IP to location map and (v) predicting a real-time location for a non-location indexed data event at multiple levels of resolutions using a machine learning model based on the dynamic IP to location map and an active Spatio-Temporal (ST) region for each unique entity identifier associated with the IP address.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5B is an exemplary location to IP map (NM2), according to some embodiments herein;

FIG. 5C is an exemplary entity location table, according to some embodiments herein;

FIGS. 6A and 6B is are an exemplary user interface view of the adaptive location assignment system of FIG. 1 for receiving one or more queries including the internet protocol (IP) indexed data streams, according to some embodiments herein;

DETAILED DESCRIPTION OF PREFERRED EMBODIMENTS

Figure 1:
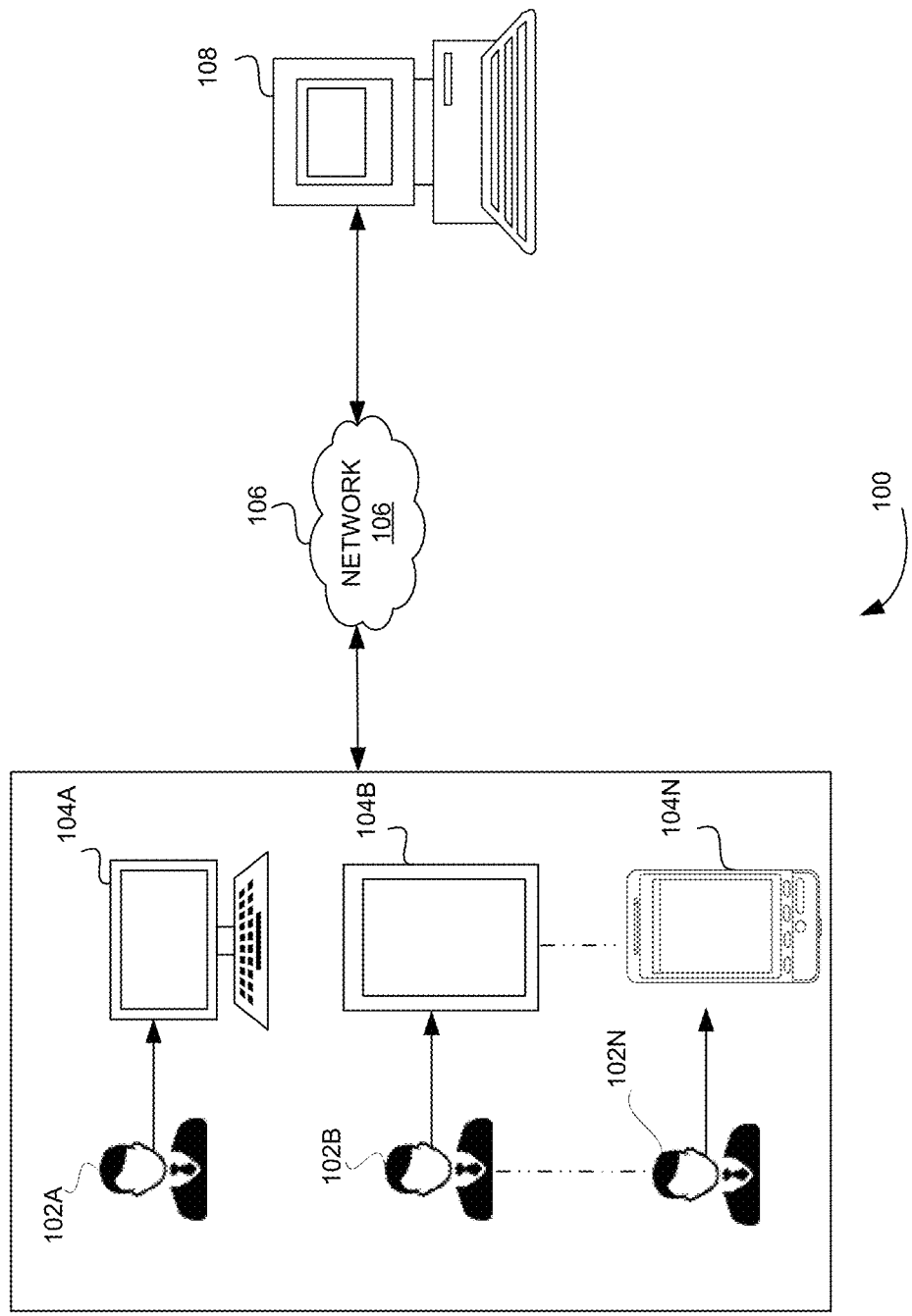
FIG. 1 illustrates a system view for estimation of location of internet protocol (IP)-indexed data streams, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for adaptive location assignment to internet protocol (IP) indexed data streams using machine learning from partially observable data streams. The embodiments herein achieve this by proposing an adaptive location assignment system that estimates real-time location for IP indexed data streams based on machine learning from partially observable data streams that are indexed with a network address and/or a location information. Referring now to the drawings, and more particularly to FIGS. 1 through 9, where similar reference characters denote corresponding features consistently throughout the figures, there are shown preferred embodiments.

The term "independently controlled data sources" refers to any source that may control or standardize different aspects of data streams. The different aspects include, but is not limited to, 1) the type of data that needs to be collected, 2) a time and location, the data needs to be collected, 3) data collection method, 4) modification of collected data, 5) portion of data to be revealed to public, 6) portion of data to be protected, 7) portion of data can be permitted by a consumer/user of the application/device, and 8) portion of data to be completely private.

A single real-world event may be tracked by different independently controlled data sources. Alternatively, data from the different independently controlled data sources may be interleaved to understand an event or sequence of events. For example, consider a consumer using multiple applications on his android phone, as he/she interacts with each application, multiple independent streams of events are produced since, each application being an independent source. Events and users may have different identifiers across different applications depending on how the application is implemented. Additionally, if one were to monitor the network, each application level event may generate additional lower level network events.

The term "partial observable data or partial data" refers to a data stream where all the events are not captured due to several reasons.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein.

FIG. 1 illustrates a system view 100 for estimation of location of internet protocol (IP)-indexed data streams, to some embodiments herein. The system view 100 includes one or more independently controlled data sources 104A-N, a network 106 and an adaptive location assignment system 108. In some embodiments, the one or more independently controlled data sources 104A-N are one or more entity devices. The one or more entity devices are associated with one or more entities 102A-N. In some embodiments, the network 106 may include, but are not limited to, a wired network, a wireless network, or a combination of network and the like. Examples of one or more entity devices may include, but not limited to, a mobile device, smartphones, tablets, computers, smart watches, IOT devices, connected vehicles, and the like. The adaptive location assignment system 108 estimates real-time location for internet protocol (IP) indexed data streams using machine learning from partially observable data streams from the one or more independently controlled data sources 104A-N that are indexed with both network address and location information. In some embodiments, the adaptive location assignment system 108 (i) receives one or more queries including the IP indexed data streams from one or more users, and (ii) estimates the real-time location for the IP indexed data streams in the one or more queries using machine learning from partially observable data streams from the one or more independently controlled data sources 104A-N that are indexed with both network address and location information. In some embodiments, the adaptive location assignment system 108 displays the estimates real-time location for the IP indexed data streams in an interactive user interface. In some embodiments, the adaptive location assignment system 108 displays the estimated real-time location for the IP indexed data streams in an interactive user interface. In some embodiments, the adaptive location assignment system 108 displays the estimated real-time location for the IP indexed data streams over a map in the interactive user interface.

Figure 2:
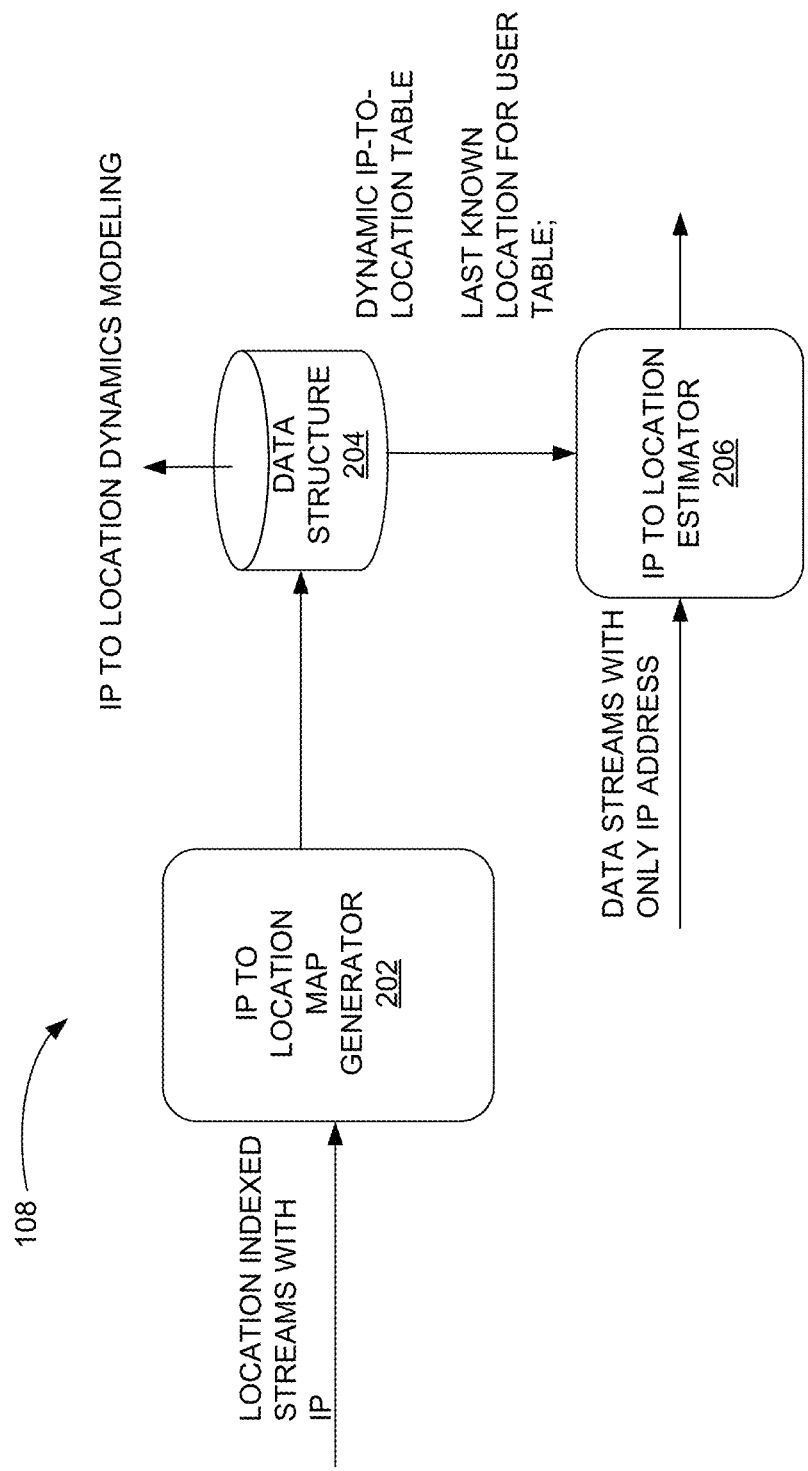
FIG. 2 is a block diagram of an adaptive location assignment system of FIG. 1, for estimating location of internet protocol (IP)-indexed data streams, according to some embodiments herein.

FIG. 2 is a block diagram of an adaptive location assignment system 108 for estimating location of internet protocol (IP)-indexed data streams, according to some embodiments herein. The adaptive location assignment system 108 includes an IP to Location map generator 202, a data structure 204, and an IP to Location estimator 206. The adaptive location assignment system 108 includes a memory to store set of instructions and a processor that is configured to execute the set of instructions to perform one or more actions related to real-time location assignment to IP indexed data streams. The IP to Location map generator 202 generates a base map by mapping IP addresses to corresponding locations at multiple levels of resolution based on historical data streams. In some embodiments, the IP to Location map generator 202 receives the historical data streams from one or more third party data sources. In some embodiments, the one or more third party data sources include, but is not limited to Xmode®, Cuebiq®, and similar other vendors. In some embodiments, the historical data streams include IP addresses along with latitude and longitude information sourced from geo-location to IP vendors. In some embodiments, the IP to Location map generator 202 generates the base map by mapping IP addresses to corresponding locations at country, state, city, and the like. In some embodiments, the base map provides a series of IPs on a trajectory of travel spanning wide regions potentially. In some embodiments, the base map includes both static and dynamic IP.

The IP to Location map generator 202 obtains, in real time, one or more location indexed data streams of entity activities from one or more independently controlled data sources. In some embodiments, the one or more location indexed data streams of entity activities is partially observable data. In some embodiments, the one or more location indexed data streams partially characterizes an activity of at least one entity. In some embodiments, the one or more independently controlled data sources 104A-N includes any network enabled device. In some embodiments, any network enabled device includes, but is not limited to, a mobile device, a smart phone, a personal digital assistant (PDA), a notebook, a global positioning system (GPS) device, wearable device, connected cars, logistics system, and the like. In some embodiments, the one or more location indexed data streams of entity activities includes, but not limited to, (i) location pings from one or more application engaged on the one or more entity devices, (ii) access pings from wireless hot-spots, (iii) active subscriber's data and location in different geo-spatial areas from the mobile network, and (iv) local information from traffic sensors or a public closed-circuit television (CCTV) camera for security and others. In some embodiments, the one or more location indexed data streams of entity activities include self-disclosed location information on a global website. In some embodiments, the entity activities include user activities. In some embodiments, the one or more location indexed data streams include an IP address, a spatio-temporal information and at least one entity identifier. In some embodiments, the entity identifier includes at least one of (i) an advertisement identifier (AdID), (ii) a cookie identifier (C) or (iii) a device identifier. In some embodiments, the spatio-temporal information includes a location data, and a time stamp data. The location data includes, latitude data, and/or longitude data. In some embodiments, the spatio-temporal information is either true GPS or a mapping provided by the advertisement exchange.

In some embodiments, the adaptive location assignment system 108 is communicatively coupled with a unifier that links one or more entity identifiers associated with one or more data streams to generate a unique entity identifier for an entity. The unifier may include, a clustering device, a disambiguator and a validator. The clustering device receives the one or more data streams and clusters the one or more entity devices by identifying entity devices having an association with each other with respect to at least one of an internet protocol (IP) address, a real-time event, a period of time or a location. The disambiguator analyses the clusters obtained from the clustering device and identifies sub-clusters that resolve to a single entity. The validator validates the single entity owns all the devices that exist in the sub-cluster against entity behavioral attributes and generates a unique entity identifier which corresponds to the single entity. In some embodiments, the unique entity identifier is also mapped to a home location of the single entity which enables the persistence of the unique entity identifier compared to traditional anonymized identifiers.

In an exemplary embodiment, John owns five devices. The incoming data streams from the five devices of John include five identifiers namely C1, C2, P1, P2, and T1 along with other payload information. The clustering device clusters the five identifiers namely C1, C2, P1, P2, and T1 based on at least one of the internet protocol (IP) address, real-time event, a period of time or a location. The disambiguator links these five identifiers and maps the unique user identifier "9517ANR". Further, the disambiguator discerns patterns of identifiers that appear to always be "on the move" together and validates behavior signals from various identifiers in order to generate the unique entity identifier "9517ANR". The behavioral attributes that are associated with all the individual identifiers may include male, 26-35, business professional, fitness freak, affluent, gamer, loves soccer and/or tennis. The disambiguator analyses the available clusters and begins to disambiguate or discern patterns of identifiers that are observed to always be together in spatio-temporal occurrences.

In an exemplary embodiment, a unique entity identifier "1001" has categorical attributes known to be a male, has a mobile identifier "1001_m" and has a plurality of cookie identifiers namely "1001_c_1", "1001_c_2", "1001_c_3" associated with it. The validator validates which cookies truly map to this mobile identifier "1001_m". The above set of identifiers is generated from 3 candidate pairs which are a union of (1001_m,1001_c_1), (1001_m, 1001_c_2) and (1001_m, 1001_c_3). The validator runs an engagement activity that targets a male segment for which the unique entity identifier "1001" is a member. Further, the validator runs an engagement activity on mobile device identifiers which include targeting the unique entity identifier 1001_m and also a cookie engagement activity consisting of all the cookies that are linked with the unique entity identifier "1001". The validator may validate if engagement is received for both the mobile identifier "1001_m" and set of cookies identifiers, it is validated that they both refer to the same individual.

In some embodiments, the adaptive location assignment system 108 is communicatively coupled with an event classifier that classifies a unified entity event from the one or more of data streams along with dynamic user attributes retrieved from a distributed memory store. In some embodiments, the unified entity event includes the values of the entity attributes.

The IP to location map generator 202 (*i*) generates an IP to location map (NM1) and a location to IP map (NM2) by mapping each network address associated with the one or more location indexed data streams to the corresponding locations of the at least one entity temporally and vice-versa, in the base map; and (ii) captures number of unique entity identifiers that are traversed on the IP addresses and time of traversal of the unique entity identifiers. In some embodiments, the IP to Location map generator 202 extrapolates data points in the partially observable data to estimate missed location data on time series and adds estimated location to the IPs to fill in time-gaps. In some embodiments, the IP to location map generator 202 generates the NM1 and the NM2 using the one or more location indexed data streams after filling the gaps in the location time series. In some embodiments, the IP to location map generator 202 updates the NM1 and the NM2 using the one or more location indexed data streams after filling the gaps in the location time series.

In some embodiments, the IP to Location map generator 202 extrapolates to fill gaps in the one or more location indexed data streams based on historical entity activities. An exemplary NM1 500A is provided in FIG. 5A. An exemplary NM2 500B is provided in FIG. 5B. It is noted that, FIG. 5A and FIG. 5B herein are provided for the purpose illustration and do not limit the scope of the invention. In some embodiments, a single IP may map to multiple locations that could be at different resolutions. In some embodiments, a single location may map to multiple IPs. In some embodiments, a static IP maps to a single location. In some embodiments, a dynamic IP maps to multiple locations. In some embodiments, the IP to Location map generator 202 generates the NM1 by mapping IP addresses from the one or more location indexed data streams to corresponding location temporally in the base map. In some embodiments, the IP to Location map generator 202 generates the NM2 by mapping location information from the one or more location indexed data streams to corresponding IP addresses temporally in the base map The IP to Location map generator 202 performs scoring and ranking for each entry in the NM1 and the NM2 based on frequency of use of the IP address, and number of unique entity identifiers per IP address or per location. In some embodiments, the IP to Location map generator 202 generates an IP-to-IP graph that shows one or more IPs that are potentially linked to each other. The IP-to-IP graph also captures IPs that are static and IPs that are dynamic, including one or more metrics on a number of unique entity identifiers that traverse an edge and a time for traversal of a respective edge.

The IP to Location map generator 202 classifies each IP addresses into static or dynamic IP address in the NM1 and the NM2 based on the scoring and ranking of each entry. The IP to Location map generator 202 filters each entry in the NM1 and NM2 to generate a dynamic IP to location map based on a scoring and a ranking of each of the entries and a classification of IP addresses. In some embodiments, the IP to Location map generator 202 analyzes and filters both entries of single IP with multiple locations and entries of single location with multiple IPs based on the scoring and the ranking of each entry and the classification of each entry. In some embodiments, expiry of entries in the NM1 and the NM2 depends on a frequency of use, a number of users per IP or per location.

In some embodiments, the IP to Location map generator 202 updates the NM1 and the NM2 when a new set of data streams arrives to the adaptive location assignment system 108 with Bayesian updating technique using Kalman filter.

In some embodiments, the adaptive location assignment system 108 includes an active spatio-temporal (ST) region estimator. The active ST region estimator identifies active ST region for each entity associated with IP address based on the one or more location indexed data streams. In some embodiments, for each unique entity identifier received, the active ST region estimator maintains the tuple-timepoint, IP, location along with the last known true location that is received via GPS. For every user or entity, the active ST region estimator maintains the last known location. An exemplary entity location table 500C that maintains last known entity location is provided in FIG. 5C. FIG. 5C herein are provided for the purpose illustration and do not limit the scope of the invention. In an exemplary scenario, if at any point in time, a user or an entity is at a physical location and cannot move to another location such as greater than 25-30 miles (depending on a mode of travel) within such as a 1 min to 5 min duration, all the pings from the user or entity must be clustered within a spatio-temporal region called an active ST region. When the user or entity engages with a set of applications and a browser on a mobile device at a point in time, an active ST region estimator receives a series of location pings interspersed with non-location pings in application, in the browser, in AdId and the cookie-based traffic. The active ST region estimator 1) assigns to all the IPs, one or more corresponding nearby locations, b) assigns to all non-location pings (either AdID or cookie)—a most frequent location in the active ST region in the time window. In some embodiments, the active ST region estimator generates a table with a last known location for the user or the entity.

The data structure 204 stores the base map, the NM1 and the NM2, the dynamic IP to Location map and the table with last known location for the user or the entity that are automatically updated when a new set of data streams arrive to the adaptive location assignment system 108. In some embodiments, the NM1 and the NM2 are represented in the form of a hyper cube that is spatially partitioned with geo hashes in terms of a key value data structure for each geo location. In some embodiments, the hyper-cube includes heterogeneous collection of geo hashes. In some embodiments, the hyper-cube includes a combination of geo hashes at granularity. In some embodiments, the key value data structure is a hyper log log (HLL) data structure. In some embodiments, the key value data structure is maintained temporally on per day basis, per hour basis, or in a rolling 30-day window. In exemplary embodiment, a country is represented by $1\times10^6$ HLLs in the hyper-cube that maintains a million keys for every day (similar for every 4-hour window). For example, for a 30-day period, the key value data structure maintains 30 million keys. In some embodiments, the dynamic IP to Location map is represented in a form of hyper cube. In some embodiments, the table with last known location for the user or the entity is represented in a form of hyper cube.

The IP to Location estimator 206 estimates a real-time location for an IP indexed data streams at multiple levels of resolutions based on the dynamic IP to location map and the active ST region of each entity. In some embodiments, the IP to Location estimator 206 uses Kalman filtering techniques on a per user or entity basis for location estimation. In some embodiments, the IP to Location estimator 206 uses land use and land type information for location estimation. For example, while considering at least two data streams that includes a location-indexed stream (LI) and a stream with IP for whom location needs to be assigned (LA), a user or an entity current position is the sum of LA+LI+error (error in estimation (LA) and due to device error, external error due to blocking of GPS etc. in LI). Kalman filters are well-understood techniques for state estimation given the previous position in dynamic systems.

In some embodiments, the IP to Location estimator 206 uses Kalman filter to estimate the next position of a user or an entity within a reasonable time interval like 10 to 30 minutes depending on where the user or the entity is located like at home, versus a shopping district etc. The Kalman filter implementation follows standard techniques plus heuristics. In some embodiments, the IP to Location estimator 206 uses the land-use pattern of the current location like residential areas vs business district vs farmland etc. to estimate the next position of the user or the entity.

In some embodiments. IP to Location estimator 206 is embedded with a machine learning model. In some embodiments, the machine learning model is trained with real-time location and IP indexed data streams along with the active ST region of each entity to receive an input query includes an IP address and to output real-time location information associated with IP address received. In some embodiments, the machine learning model is trained with the base map, the dynamic IP to location map and the table with last known location for the user or the entity.

In some embodiments, the IP to Location estimator 206 is executed on offline mode. In some embodiments, the IP to Location estimator 206 is refreshed periodically. In some embodiments, the IP to Location estimator 206 is refreshed every 24 hours.

In some embodiments, the estimated location for IP indexed data streams is used for evaluating visit histories per unique entity identifier, and an offline attribution per unique entity identifier for a region of interest (ROI) based on estimated location for a non-location indexed data event.

In some embodiments, a media content is transmitted to entity devices associated with the ROI when visit histories per unique entity identifier, and an offline attribution per unique entity identifier is high for the ROI. In some embodiments, an output of the IP to location estimator 206 is used for fraud detection and filtering out a lot of noisy traffic, unstable applications, and the like.

The adaptive location assignment system 108 enables the practical application of hyper-local campaigns to non-location traffic that in turn improves several aspects of campaign delivery. Location attribution may also improve offline attribution, and thereby potentially improve dwell time measures and consequently also de-risk dependence on only location traffic whose scale is reduced due to tightening privacy needs in many markets.

Figure 3:
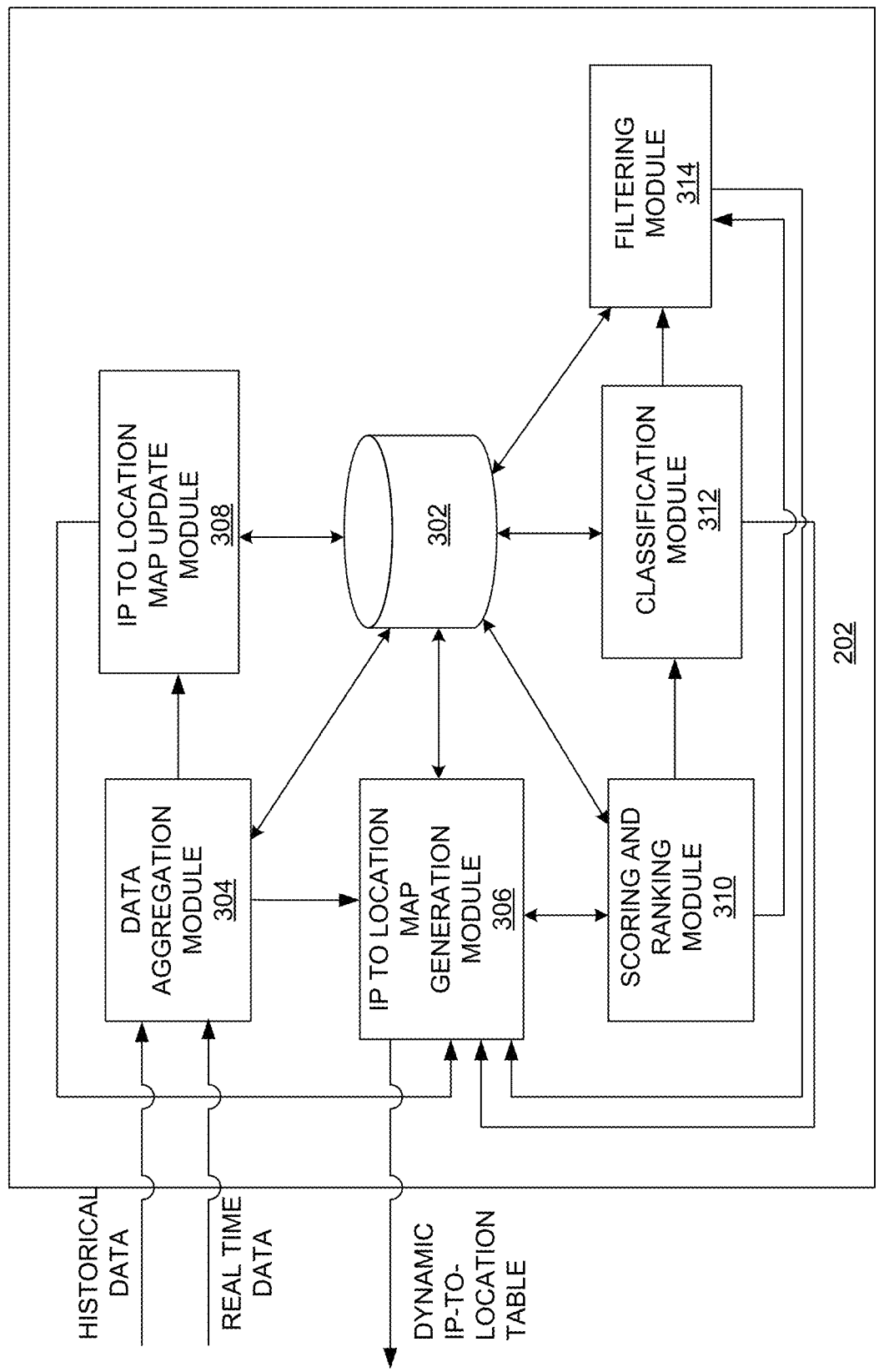
FIG. 3 is a block diagram of an IP to location map generator of FIG. 2, according to some embodiments herein.

FIG. 3 is a block diagram of an IP to location map generator 202 of FIG. 2 according to some embodiments herein. The IP to location map generator 202 includes a database 302, a data aggregation module 304, an IP to location map generation module 306, an IP to location map update module 308, a scoring and ranking module 310, a classification module 312, and a filtering module 314. In some embodiments, the database 302 is used by each of the data aggregation module 304, the IP to location map generation module 306, the IP to location map update module 308, the scoring and ranking module 310, the classification module 312, and the filtering module 314 to store data. The data aggregation module 304 receives (i) a historical data streams from one or more third party data sources and (ii) a real-time one or more location indexed data streams of entity activities from one or more independently controlled data sources 104A-N. In some embodiments, the one or more third party data sources include, but not limited to Xmode®, Cuebiq®, and similar other vendors. In some embodiments, the historical data streams include IP addresses along with latitude and longitude information sourced from vendors such as maxmind. In some embodiments, the one or more location indexed data streams of entity activities is partially observable data. In some embodiments, the one or more independently controlled data sources 104A-N includes a network enabled device. Examples of the network enabled device includes, but not limited to, a mobile device, a smart phone, a personal digital assistant (PDA), a notebook, a global positioning system (GPS) device, wearable device, connected cars, logistics system, and the like. In some embodiments, the one or more location indexed data streams of entity activities includes, but not limited to, (i) location pings from one or more application engaged on the one or more user devices, (ii) access pings from wireless hot-spots, (iii) active subscriber's data and location in different geo-areas (GSM) from the mobile network, and (iv) local information from traffic sensors or a public CCTV camera for security and the like. In some embodiments, the one or more location indexed data streams of entity activities include self-disclosed location information on a global website. In some embodiments, the entity activities include user activities. In some embodiments, the one or more location indexed data streams include an IP address, spatio-temporal information and at least one entity identifier. In some embodiments, at least one entity identifier includes at least one of (i) an advertisement identifier (AdID), (ii) a cookie identifier (C) or (iii) a device identifier. In some embodiments, the spatio-temporal information includes location data, and time stamp data. The location data includes latitude data, and longitude data. In some embodiments, the spatio-temporal information is either true GPS or a mapping provided by the advertisement exchange. In some embodiments, a unifier that is communicatively coupled with the IP to location map generator 202 to generate a unique entity identifier for each entity by linking the one or more entity identifiers in the one or more location indexed data streams.

The IP to location map generation module 306 generates a base map by mapping IP addresses to corresponding locations at multiple levels of resolution based on the historical data streams. In some embodiments, the IP to location map generation module 306 generates the base map by mapping IP addresses to corresponding locations at country, state, city etc. In some embodiments, the base map provides a series of IPs on a trajectory of travel spanning wide regions potentially. In some embodiments, the base map includes both static and dynamic IP.

In some embodiments, IP to location map generator 202 includes an extrapolation module that extrapolates data points in the partially observable data to estimate missed location data on time series and adds estimated location to the IPs to fill in time-gaps.

The IP to location map update module 308 updates, in real-time, the base map to generate an IP to location map (NM1) and a location to IP map (NM2) by (i) mapping the IP address and/or location from the one or more location indexed data streams to corresponding location and/or IP addresses temporally. In some embodiments, a single IP may map to multiple locations that could be at different resolutions. In some embodiments, a single location may map to multiple IPs. In some embodiments, a static IP maps a single location. In some embodiments, a dynamic IP maps to multiple locations. The NM1 and NM2 may optionally include IPs mapped with multiple locations and locations mapped with multiple IPs respectively.

The scoring and ranking module 310 performs scoring and ranking for each entry in the NM1 and the NM2 based on frequency of use of the IP address, and number of entity identifiers per IP address or per location. In some embodiments, the IP to Location map generator 202 includes an IP-to-IP graph generation module. The IP-to-IP graph generation module generates an IP-to-IP graph that shows one or more IPs are potentially linked to each other. The IP-to-IP graph also captures IPs that are static and IPs that are dynamic, including metrics on a number of unique entity identifiers that traverse an edge and a time for traversal of a respective edge.

The classification module 312 classifies each IP addresses into static or dynamic IP address in the NM1 and the NM2 based on the scoring and ranking of each entry. The filtering module 314 filters each entry in the NM1 and the NM2 to generate a dynamic IP to location map based on scoring and ranking of each entries and classification of IP addresses. In some embodiments, the filtering module 314 analyzes and filters both entries of single IP with multiple locations and entries of single location with multiple IPs based on scoring and ranking of each entry and classification of each entry. In some embodiments, expiry of entries in the NM1 and the NM2 depends on a frequency of use, a number of users per IP or per location.

The IP to location map generation module 306 generates the dynamic IP to location map by communicating with the scoring and ranking module 310, the classification module 312 and the filtering module 314.

Figure 4A:
FIGS. 4A and 4B are exemplary trajectory images based on location indexed data stream associated with an entity from independently controlled data sources, according to some embodiments herein.
Figure 4B:
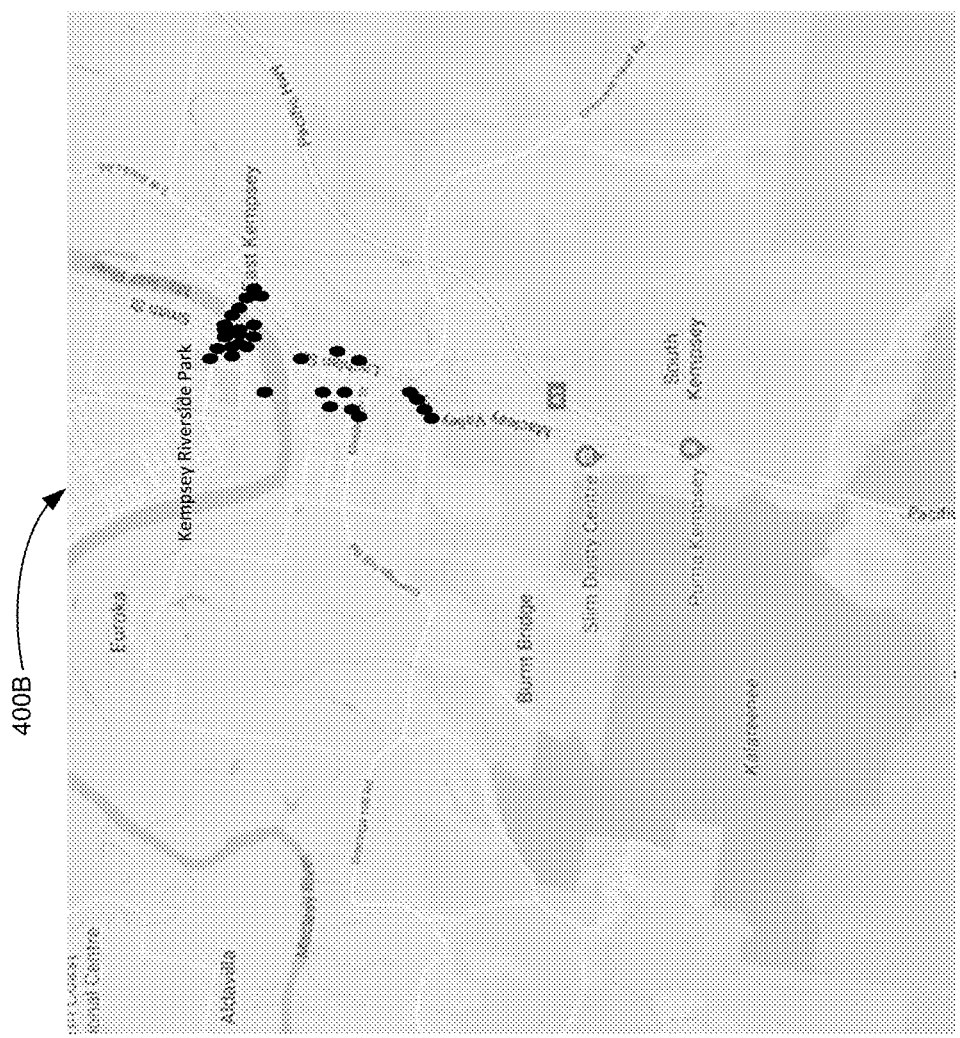

FIG. 4A illustrates an exemplary trajectory image 400A that is generated based on location indexed data stream associated with a first entity from a first independently controlled data source. FIG. 4B illustrates an exemplary trajectory image 400B that is generated based on a location indexed data stream associated with the first entity from a second independently controlled data source. The trajectory image in the FIGS. 4A and 4B show that there is partial observability and a gap in the location indexed data stream. The gap in the trajectory of the entity happens due to a partial data that includes a location data not observed when GPS times out or the user switches off the GPS. The partial data introduces gaps in the location time series, but not in the IP time series. In some embodiments, the IP to location map generator 202 extrapolates data points in the partial data to estimate missed location data on time series and adds estimated location to the IPs to fill in time-gaps. For example, if a person is on the road before the gap, the same person should be on the road for the rest of the time after the gap. The IP to Location map generator 202 generates the NM1 and the NM2 using the one or more location indexed data streams after filling the gaps in the location time series. In some embodiments, the IP to location map generator 202 updates the NM1 and the NM2 using the one or more location indexed data streams after filling the gaps in the location time series.

Figure 5A:
FIG. 5A is an exemplary IP to location map (NM1), according to some embodiments herein.

FIG. 5A is an exemplary IP to location map (NM1), according to some embodiments herein. FIG. 5B is an exemplary location to IP map (NM2), according to some embodiments herein. It is noted that, FIG. 5A and FIG. 5B herein are provided for the purpose illustration and do not limit the scope of the invention. In some embodiments, a single IP may map to multiple locations that could be at different resolutions. In some embodiments, a single location may map to multiple IPs. In some embodiments, a static IP maps to a single location. In some embodiments, a dynamic IP maps to multiple locations. In some embodiments, the IP to Location map generator 202 generates the NM1 by mapping IP addresses from the one or more location indexed data streams to corresponding location temporally in the base map. In some embodiments, the IP to Location map generator 202 generates the NM2 by mapping location information from the one or more location indexed data streams to corresponding IP addresses temporally in the base map The IP to Location map generator 202 performs scoring and ranking for each entry in the NM1 and the NM2 based on frequency of use of the IP address, and number of unique entity identifiers per IP address or per location. In some embodiments, the IP to Location map generator 202 generates an IP-to-IP graph that shows one or more IPs that are potentially linked to each other. The IP-to-IP graph also captures IPs that are static and IPs that are dynamic, including one or more metrics on a number of unique entity identifiers that traverse an edge and a time for traversal of a respective edge.

The IP to Location map generator 202 classifies each IP addresses into static or dynamic IP address in the NM1 and the NM2 based on the scoring and ranking of each entry. The IP to Location map generator 202 filters each entry in the NM1 and NM2 to generate a dynamic IP to location map based on a scoring and a ranking of each of the entries and a classification of IP addresses. In some embodiments, the IP to Location map generator 202 analyzes and filters both entries of single IP with multiple locations and entries of single location with multiple IPs based on the scoring and the ranking of each entry and the classification of each entry. In some embodiments, expiry of entries in the NM1 and the NM2 depends on a frequency of use, a number of users per IP or per location.

In some embodiments, the IP to Location map generator 202 updates the NM1 and the NM2 when a new set of data streams arrives to the adaptive location assignment system 108 with Bayesian updating technique using Kalman filter.

In some embodiments, the adaptive location assignment system 108 includes an active spatio-temporal (ST) region estimator. The active ST region estimator identifies active ST region for each entity associated with IP address based on the one or more location indexed data streams. In some embodiments, for each unique entity identifier received, the active ST region estimator maintains the tuple—timepoint, IP, location along with the last known true location that is received via GPS. For every user or entity, the active ST region estimator maintains the last known location. An exemplary entity location table 500C that maintains last known entity location is provided in FIG. 5C. FIG. 5C herein are provided for the purpose illustration and do not limit the scope of the invention. In an exemplary scenario, if at any point in time, a user or an entity is at a physical location and cannot move to another location such as greater than 25-30 miles (depending on a mode of travel) within such as a 1 min to 5 min duration, all the pings from the user or entity must be clustered within a spatio-temporal region called an active ST region. When the user or entity engages with a set of applications and a browser on a mobile device at a point in time, an active ST region estimator receives a series of location pings interspersed with non-location pings in application, in the browser, in AdId and the cookie-based traffic. The active ST region estimator 1) assigns to all the IPs, one or more corresponding nearby locations, b) assigns to all non-location pings (either AdID or cookie)—a most frequent location in the active ST region in the time window. In some embodiments, the active ST region estimator generates a table with a last known location for the user or the entity.

FIGS. 6A and 6B are exemplary user interface views of the adaptive location assignment system of FIG. 1 for receiving one or more queries including the internet protocol (IP) indexed data streams, according to some embodiments herein. FIG. 6A illustrates an exemplary user interface view of search page 600A. The search page 600A includes a login interface 602 and a query defining space 604. The login interface 602 allows a user to enter login details such as user id and password for logging into the adaptive location assignment system 108. The query defining space 604 allows the user to define a search query in a natural language upon login to the adaptive location assignment system 108. The search page 600A enables a user to search location information in the adaptive location assignment system 108 by providing a query that includes IP address. FIG. 6B illustrates an exemplary user interface of result page 600B. The result page 600B provides the search results based on the query provided by the user. In some embodiments, the user interface view of result page 600B allows the user to provide additional selection criteria to the search result.

Figure 7:
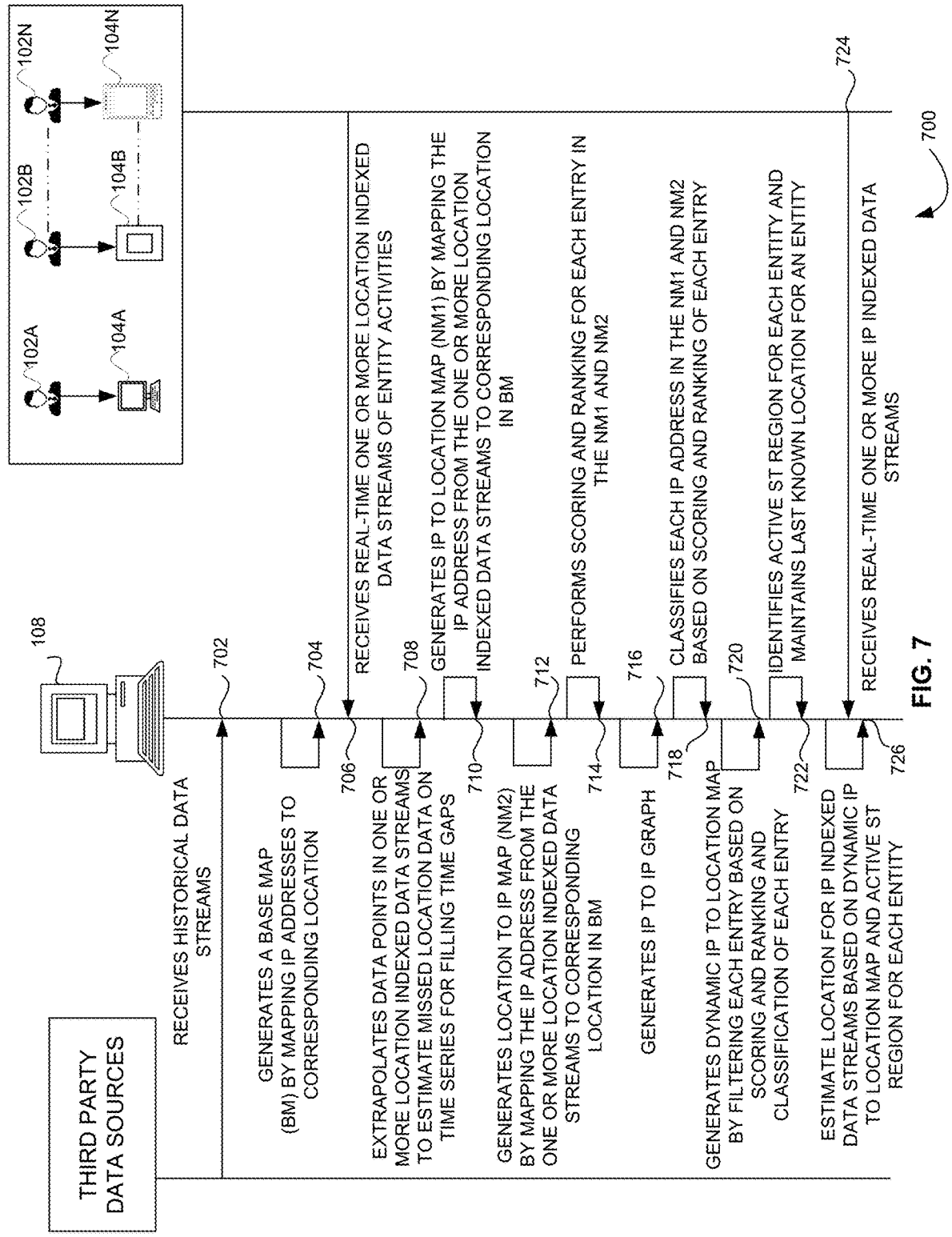
FIG. 7 is an interaction diagram that illustrates a method of adaptive location assignment to internet protocol (IP) indexed data streams using machine learning from partially observable data streams, according to some embodiments herein.

FIG. 7 is an interaction diagram that illustrates a method of adaptive location assignment to internet protocol (IP)

indexed data streams using machine learning from partially observable data streams, according to some embodiments herein. At step 702, the method 700 includes receiving historical data streams from one or more third party data sources. In some embodiments, the one or more third party data sources include, but is not limited to Xmode®, Cuebiq®, and similar other vendors. In some embodiments, the historical data streams include IP addresses along with latitude and longitude information sourced from geo-location to IP vendors. At step 704, the method 700 includes generating a base map by mapping IP addresses to corresponding locations at multiple levels of resolution based on the historical data streams. In some embodiments, the method 700 generates the base map by mapping IP addresses to corresponding locations at country, state, city, and the like. In some embodiments, the base map provides a series of IPs on a trajectory of travel spanning wide regions potentially. In some embodiments, the base map includes both static and dynamic IP. At step 706, the method 700 includes receiving, in real time, one or more location indexed data streams of entity activities from one or more independently controlled data sources. In some embodiments, the one or more location indexed data streams of entity activities is partially observable data. In some embodiments, the one or more independently controlled data sources 104A-N includes any network enabled device. In some embodiments, any network enabled device includes, but is not limited to, a mobile device, a smart phone, a personal digital assistant (PDA), a notebook, a global positioning system (GPS) device, wearable device, connected cars, logistics system, and the like.

At step 708, the method 700 includes extrapolating data points in the one or more location indexed data streams to estimate missed location data on time series and adds estimated location to the IPs to fill in time-gaps. For example, if a person is on the road before the gap, the same person should be on the road for the rest of the time after the gap. At step 710, the method 700 includes generating an IP to location map (NM1) and a location to IP map (NM2) by mapping the IP address and/or location to corresponding location and/or IP addresses temporally in the base map from the one or more location indexed data streams after filling the gaps in the location time series. At step 712, the method 700 includes generating location to IP map (NM2) by mapping the IP address from the one or more location indexed data streams to corresponding location in BM. At step 714, the method 700 includes performing scoring and ranking for each entry in the NM1 and the NM2 based on frequency of use of the IP address, and number of entity identifiers per IP address or per location. At step 716, the method 700 includes generating an IP to IP graph that shows one or more IPs are potentially linked to each other. In some embodiments, the IP-to-IP graph also captures IPs that are static and IPs that are dynamic, including metrics on a number of unique entity identifiers that traverse an edge and a time for traversal of a respective edge. At step 718, the method 700 includes classifying each IP addresses into static or dynamic IP address in the NM1 and the NM2 based on the scoring and ranking of each entry. At step 720, the method 700 includes generating a dynamic IP to location map by filtering each entry in the NM1 and the NM2 based on scoring and ranking of each entries and classification of IP addresses. At step 722, the method 700 includes identifying active ST region for each entity associated with IP address based on the one or more location indexed data streams. In some embodiments, the method 700 maintains the tuple—timepoint, IP, location along with the last known true location that is received via GPS. At step 724, the method 700 receiving real-time one or more IP indexed data streams. At step 726, the method 700 estimating real-time location for the real-time one or more IP indexed data streams at multiple levels of resolutions based on the dynamic IP to location map and the active ST region of each entity.

Figure 8A:
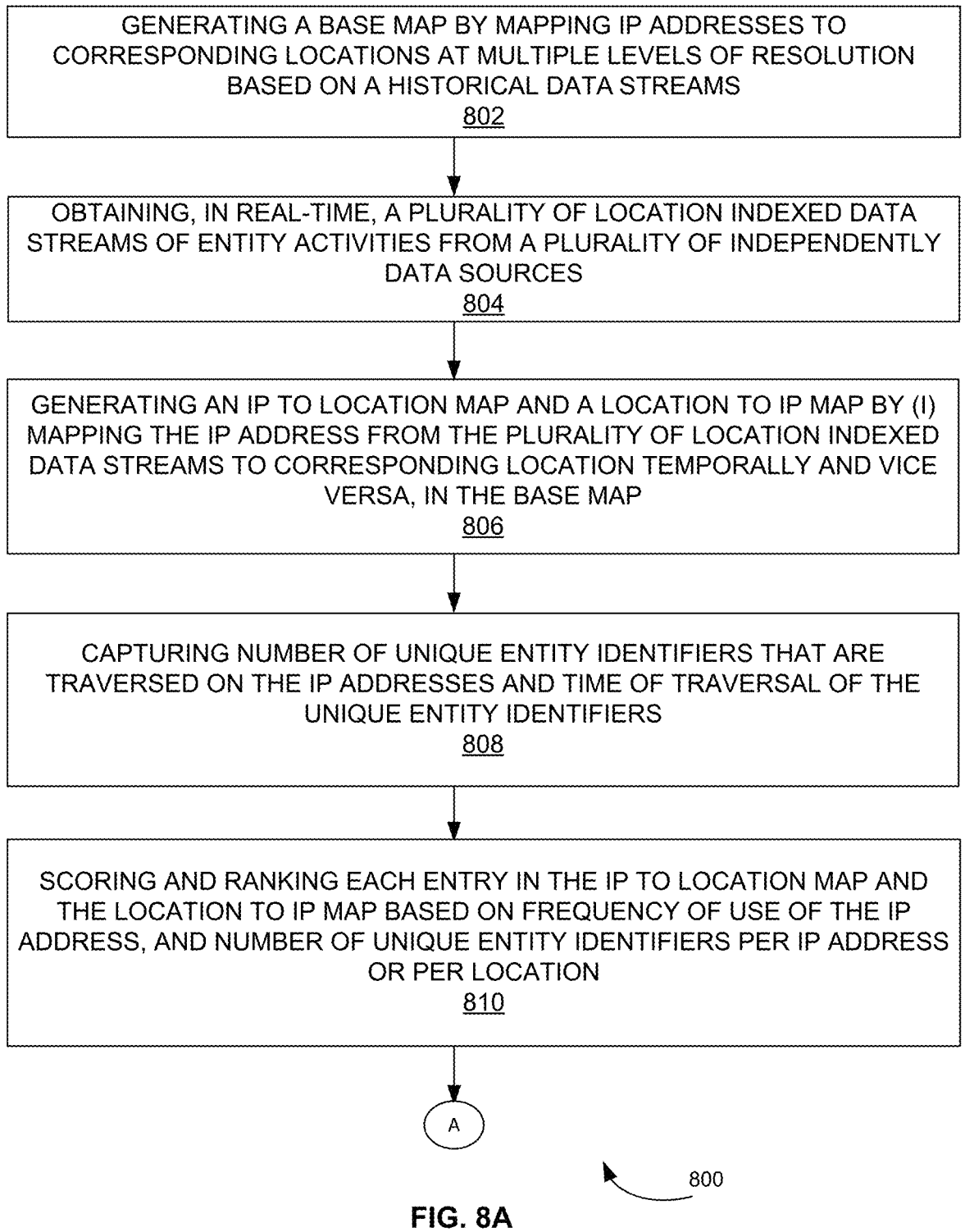
FIGS. 8A and 8B are flowcharts that illustrate a method of adaptive location assignment to internet protocol (IP) indexed data streams using machine learning from partially observable data streams, according to some embodiments herein.
Figure 8B:
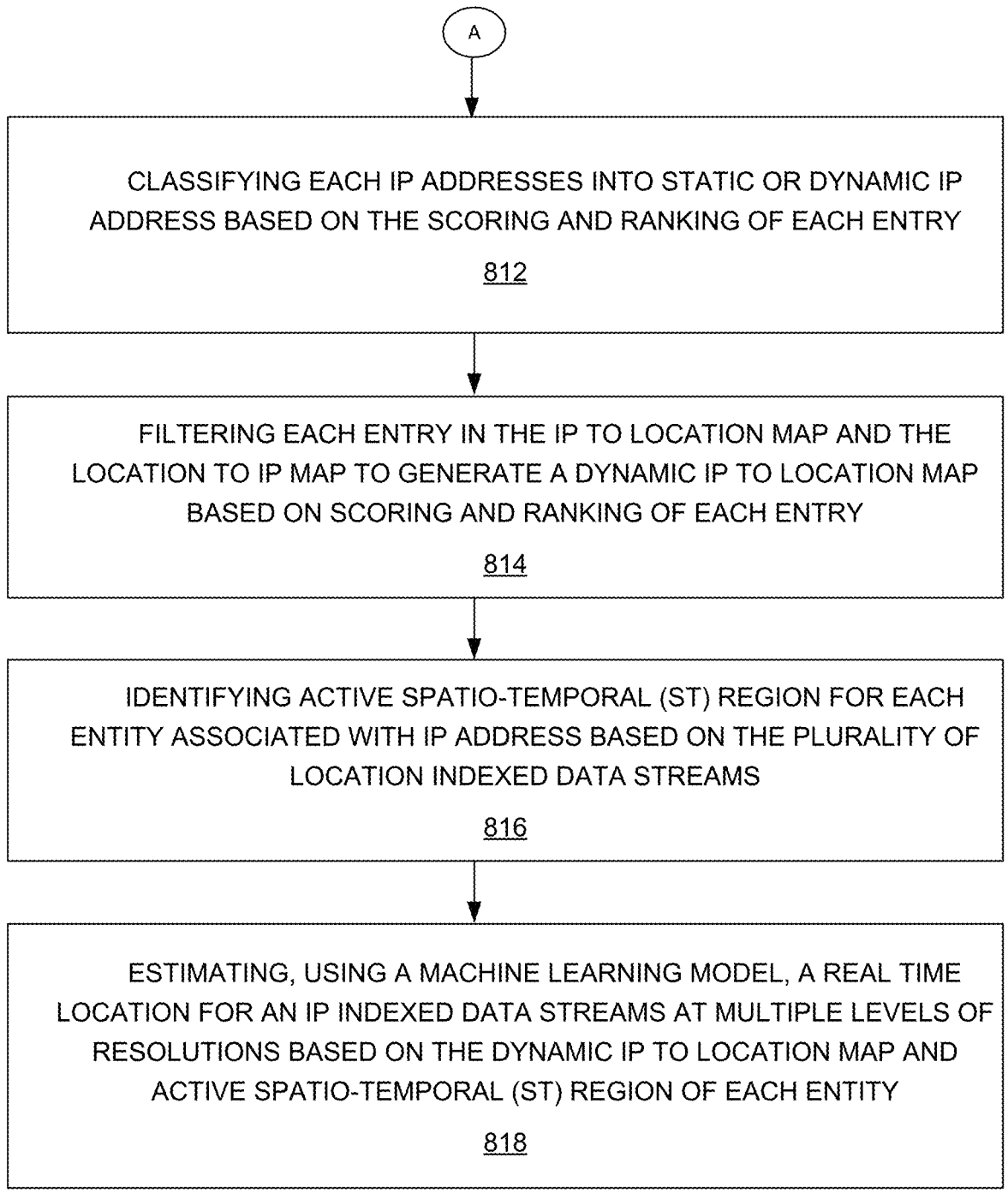

FIG. 8A and FIG. 8B are flowcharts that illustrate a method 800 of adaptive location assignment to Internet protocol (IP) indexed data streams using machine learning from partially observable data streams, according to some embodiments herein. At step 802, the method 800 includes generating a base map by mapping IP addresses to corresponding locations at multiple levels of resolution based on a historical data stream. At step 804, the method 800 includes obtaining one or more location indexed data streams of entity activities from one or more independently controlled data sources 104A-N. The one or more location indexed data streams include an IP address, spatio-temporal information and at least one entity identifier or a unique entity identifier. At step 806, the method 800 includes generating an IP to location map (NM1) and a location to IP map (NM2) by (i) mapping the IP address from the one or more location indexed data streams to corresponding location temporally in the base map. At step 808, the method 800 includes capturing a number of unique entity identifiers that are traversed on the IP addresses and time of traversal of the entity identifiers. At step 810, the method 800 includes scoring and ranking each entry in the NM1 and the NM2 based on a frequency of use of the IP address, and a number of unique entity identifiers per IP address or per location. In some embodiments, each entry includes at least one of (i) a single IP address mapped with a single location, (ii) a single IP address mapped with multiple locations, (iii) a single location mapped with multiple IP addresses or (iv) a single location mapped with a single IP address. At step 812, the method 800 includes classifying each IP addresses into static or dynamic IP address in the NM1 and the NM2 based on the scoring and the ranking of each entry. In some embodiments, the static or dynamic IP address is mapped with an active location. At step 814, the method 800 includes filtering each entry in the NM1 and NM2 to generate a dynamic IP to location map based on the scoring and the ranking of each of the entries and the classification of IP addresses. At step 816, the method 800 includes identifying an active spatio-temporal (ST) region for each entity associated with IP address based on the one or more location indexed data streams. At step 818, the method 800 includes estimating a real-time location for an IP indexed data stream at multiple levels of resolutions using a machine learning model based on the dynamic IP to location map and an active spatio-temporal (ST) region of each entity.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 9:
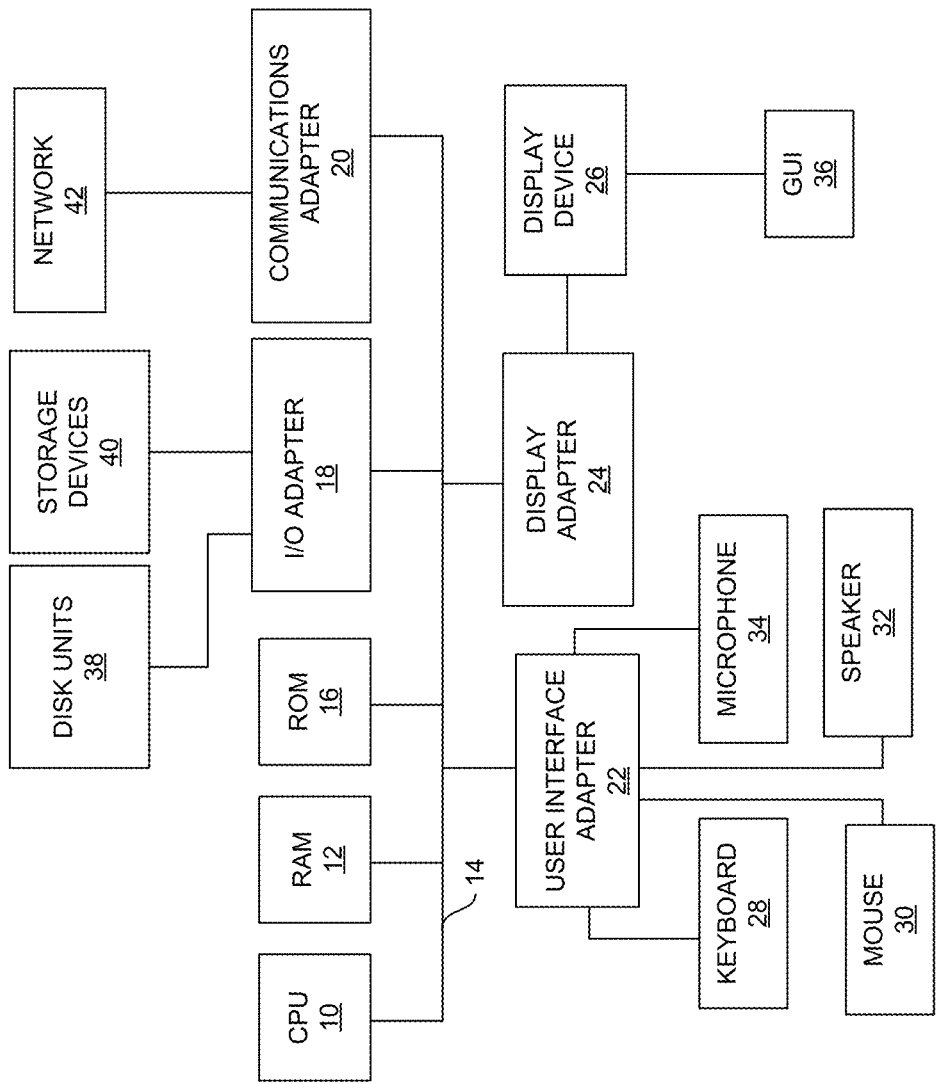
FIG. 9 is a schematic diagram of computer architecture of a computing device, in accordance with the embodiments herein.

FIG. 9 is a schematic diagram of computer architecture of a computing device, in accordance with the embodiments herein. A representative hardware environment for practicing the embodiments herein is depicted in FIG. 9, with reference to FIGS. 1 through 8B. This schematic drawing illustrates a hardware configuration of a server/computer system/computing device in accordance with the embodiments herein. The system includes at least one processing device CPU 10 that may be interconnected via system bus 14 to various devices such as a random-access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for predicting a real-time location for non-location indexed data events based on a partially observable plurality of location indexed data streams, the method comprising:

obtaining, in real time, a plurality of location indexed data streams of entity activities from a plurality of independently controlled data sources, wherein the plurality of location indexed data streams partially characterizes an activity of at least one entity;

generating and updating in the real-time, an IP to location map by mapping a first set of internet protocol (IP) addresses from the one or more location indexed data streams to a first set of locations temporally, wherein entries in the IP to location map has a one-to-many relationship;

generating and updating in the real-time, a location to IP map by mapping a second set of locations from the one or more location indexed data streams to a second set of IP addresses temporally, wherein entries in the location to IP map has a one-to-many relationship;

scoring and ranking each entry in the IP to location map and the location to IP map based on a frequency of use of IP address, and a number of unique entity identifiers for each IP address or each location;

classifying each IP address in the IP to location map and the location to IP map as a static or a dynamic IP address based on the scoring and ranking of each entry;

filtering each entry in the IP to location map and the location to IP map based on the scoring and the ranking of each entry in the IP to location map and the location to IP map to generate a dynamic IP to location map;

training a machine learning model with (i) real-time location indexed data streams along with an active Spatio-Temporal region of each unique entity identifier, (ii) the dynamic IP to location map and a table comprising last known locations of the at least one entity; and predicting the real-time location for the non-location indexed data event using the machine learning model that is trained using the dynamic IP to location map and the active Spatio-Temporal (ST) region for each unique entity identifier associated with the IP address, wherein the non-location indexed data event is an event of data production via an entity device without corresponding location of the entity device.

2. The method of claim 1, further comprising identifying the active Spatio-Temporal region for each unique entity identifier associated with the IP address based on the plurality of location indexed data streams.

3. The method of claim 1, wherein the method comprises extrapolating data points in the plurality of location indexed data streams to estimate missed location data on time series and adding an estimated location to the IPs to fill in time-gaps in the plurality of location indexed data streams.

4. The method of claim 3, wherein the method comprises updating the IP to location map and the location to IP map based on the plurality of location indexed data streams filled with missed location data on time series.

5. The method of claim 1, wherein the method comprises updating the IP to location map and the location to IP map when a new set of data streams arrives with Bayesian updating technique using Kalman filter.

6. The method of claim 1, wherein the machine learning model that is trained receives an input query comprises an IP address and to output real-time location information associated with IP address received.

7. The method of claim 1, wherein the plurality of location indexed data streams comprises latitude data and longitude data.

8. The method of claim 1, wherein the plurality of location indexed data streams comprises an IP address, a Spatio-Temporal information and at least one entity identifier, wherein the at least one entity identifier comprises at least one of (i) an advertisement identifier (AdID), (ii) a cookie identifier (C) or (iii) a device identifier.

9. The method of claim 1, wherein the plurality of location indexed data streams of the entity activity comprises at least one of (i) location pings from one or more application engaged on the one or more entity devices, (ii) access pings from wireless hot-spots, (iii) active subscriber's data and location in different geo-areas (GSM) from the mobile network, and (iv) local information from traffic sensors or a public CCTV camera for security.

10. One or more non-transitory computer-readable storage medium storing the one or more sequence of instructions, which when executed by the one or more processors, causes to perform a method of predicting a real-time location for non-location indexed data events based on a partially observable plurality of location indexed data streams comprising:
obtaining, in real time, a plurality of location indexed data streams of entity activities from a plurality of independently controlled data sources, wherein the plurality of location indexed data streams partially characterizes an activity of at least one entity;
generating and updating in the real-time, an IP to location map by mapping a first set of internet protocol (IP) addresses from the one or more location indexed data streams to a first set of locations temporally, wherein entries in the IP to location map has a one-to-many relationship;
generating and updating in the real-time, a location to IP map by mapping a second set of locations from the one or more location indexed data streams to a second set of IP addresses temporally, wherein entries in the location to IP map has a one-to-many relationship;
scoring and ranking each entry in the IP to location map and the location to IP map based on a frequency of use of IP address, and a number of unique entity identifiers for each IP address or each location;
classifying each IP address in the IP to location map and the location to IP map as a static or a dynamic IP address based on the scoring and ranking of each entry;
filtering each entry in the IP to location map and the location to IP map based on the scoring and the ranking of each entry in the IP to location map and the location to IP map to generate a dynamic IP to location map;
training a machine learning model with (i) real-time location indexed data streams along with an active Spatio-Temporal region of each unique entity identifier, (ii) the dynamic IP to location map and a table comprising last known locations of the at least one entity; and
predicting the real-time location for the non-location indexed data event using the machine learning model that is trained using the dynamic IP to location map and the active Spatio-Temporal (ST) region for each unique entity identifier associated with the IP address, wherein the non-location indexed data event is an event of data production via an entity device without corresponding location of the entity device.

11. A system for predicting a real-time location for non-location indexed data events based on a partially observable plurality of location indexed data streams, wherein said system comprises,
a processor;
a memory that stores set of instructions, which when executed by the processor, causes to perform:
obtaining, in real time, a plurality of location indexed data streams of entity activities from a plurality of independently controlled data sources, wherein the plurality of location indexed data streams partially characterizes an activity of at least one entity;
generating and updating in the real-time, an IP to location map by mapping a first set of internet protocol (IP) addresses from the one or more location indexed data streams to a first set of locations temporally, wherein entries in the IP to location map has a one-to-many relationship;
generating and updating in the real-time, a location to IP map by mapping a second set of locations from the one or more location indexed data streams to a second set of IP addresses temporally, wherein entries in the location to IP map has a one-to-many relationship;
scoring and ranking each entry in the IP to location map and the location to IP map based on a frequency of use of IP address, and a number of unique entity identifiers for each IP address or each location;
classifying each IP address in the IP to location map and the location to IP map as a static or a dynamic IP address based on the scoring and ranking of each entry;
filtering each entry in the IP to location map and the location to IP map based on the scoring and the ranking of each entry in the IP to location map and the location to IP map to generate a dynamic IP to location map;
training a machine learning model with (i) real-time location indexed data streams along with an active Spatio-Temporal region of each unique entity identifier (ii) the dynamic IP to location map and a table comprising last known locations of the at least one entity; and
predicting the real-time location for the non-location indexed data event using the machine learning model that is trained using the dynamic IP to location map and the active Spatio-Temporal (ST) region for each unique entity identifier associated with the IP address, wherein the non-location indexed data event is an event of data production via an entity device without corresponding location of the entity device.

12. The system of claim 11, wherein the processor is configured to identify the active Spatio-Temporal region for each unique entity identifier associated with the IP address based on the plurality of location indexed data streams.

13. The system of claim 11, wherein the processor is configured to extrapolate data points in the plurality of location indexed data streams to estimate missed location data on time series and add estimated location to the IPs to fill in time-gaps in the plurality of location indexed data streams.

14. The system of claim 13, wherein the processor is configured to update the IP to location map and the NM2 based on the plurality of location indexed data streams filled with missed location data on time series.

15. The system of claim 11, wherein the processor is configured to update the IP to location map and the location to IP map when a new set of data streams arrives with Bayesian updating technique using Kalman filter.

16. The system of claim 11, wherein the machine learning model that is trained receives an input query comprises an IP address and to output real-time location information associated with IP address received.

17. The system of claim 11, wherein the plurality of location indexed data streams comprises an IP address, a Spatio-Temporal information and at least one entity identifier, wherein the at least one entity identifier comprises at least one of (i) an advertisement identifier (AdID), (ii) a cookie identifier (C) or (iii) a device identifier.

18. The system of claim 11, wherein the plurality of location indexed data streams of the entity activity comprises at least one of (i) location pings from one or more application engaged on the one or more entity devices, (ii) access pings from wireless hot-spots, (iii) active subscriber's data and location in different geo-areas (GSM) from the mobile network, and (iv) local information from traffic sensors or a public CCTV camera for security.

* * * * *